K. IMHOFF.
TREATING SEWAGE.
APPLICATION FILED FEB. 19, 1910.

978,889.

Patented Dec. 20, 1910.

Witnesses:
A. Morrill
S. Ford

Inventor
Karl Imhoff
by R. Hadden
Attorney

UNITED STATES PATENT OFFICE.

KARL IMHOFF, OF BREDENEY, NEAR ESSEN, GERMANY.

TREATING SEWAGE.

978,889.  Specification of Letters Patent.  Patented Dec. 20, 1910.

Application filed February 19, 1910.  Serial No. 544,852.

*To all whom it may concern:*

Be it known that I, KARL IMHOFF, a subject of the German Emperor, residing at Bredeney, near Essen, in Germany, have invented a certain new and useful Improvement in Treating Sewage, of which the following is a specification.

This invention relates to the method of sewage treatment in which sedimentation takes place in successive chambers. It also relates to that method of sewage treatment which consists in spreading the sewage on bacteria beds, with mechanical purifying sedimentation preceding and succeeding the treatment on the beds.

Typical apparatus for this purpose is illustrated in the accompanying drawings, in which—

Figure 1:
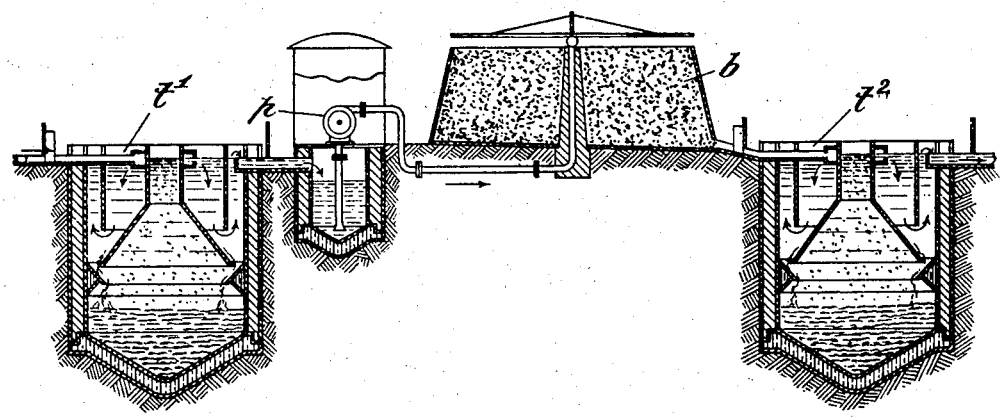
Figure 2:
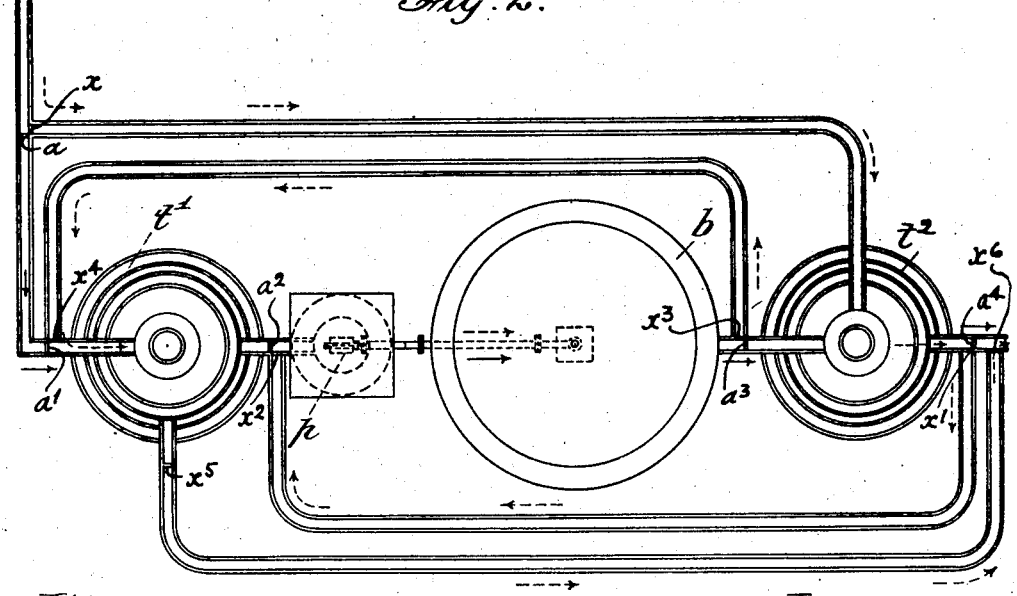

Figure 1 is a vertical section thereof, and Fig. 2 a plan-view.

This apparatus comprises a subsidence tank $t^1$, a pump $p$, a percolating bed $b$ and a subsidence tank $t^2$. It has heretofore been customary to permanently use one of the tanks, say $t^1$ as the preliminary mechanical purifier, and the other tank, $t^2$ as the final mechanical purifier, the flow of the sewage water being always in the direction from tank $t^1$ through pump $p$ and bed $b$ to tank $t^2$. The sludge deposited in the two tanks is in that case of different kinds, and the second tank receives less than the first. In some respects the qualities of the preliminary deposit are more favorable, and in other respects those of the final deposit are to be preferred. Thus, for example, the final deposit is more mobile, but on the other hand requires a longer period to become odorless. In general the conditions in the two tanks vary considerably, the temperature in the second tank being usually lower than that in the first. The fact that two different kinds of deposit or sludge have to be dealt with, and in part dealt with in different fashion, involves disadvantages which can be obviated or reduced by mixing the two sludges in the course of their deposition, and the present invention consists in effecting this by alternately using each of the tanks as the first in the series. By this means each tank will contain a substantially similar sludge mixture and the unfavorable qualities of the preliminary deposit are mitigated or obviated by contrary qualities of the final deposit, and vice versa. More uniform decomposition of the sludge is obtained, and the tanks can supplement each other in case of need, rendering special "stand-by" tanks unnecessary.

As may be understood from Fig. 2, by withdrawal of the sluices $a\ a^1\ a^2\ a^3\ a^4$, the sewage will pass through the tank $t^1$ pump $p$, bed $b$ and tank $t^2$, or by insertion of these sluices and the withdrawal of the sluices $x\ x^1\ x^2\ x^3\ x^4\ x^5\ x^6$, it will pass through the tank $t^2$ pump $p$ bed $b$ and tank $t^1$.

What I claim as my invention and desire to secure by Letters Patent of the United States is:—

1. The method of treating sewage in successive depositing chambers consisting in reversing the flow in order to obtain a similar sludge mixture in each depositing chamber.

2. The method of treating sewage in successive depositing chambers consisting in periodically reversing the succession.

3. The method of treating sewage consisting in passing it through a sedimentation tank, thence to a biological filter, thence to a further sedimentation tank and periodically changing the direction of movement so that each sedimentation tank is alternately employed as the first and final tank respectively.

In witness whereof I have signed this specification in the presence of two witnesses.

KARL IMHOFF.

Witnesses:
 ERNEST X. IVES,
 W. W. SCHMIDT.